Jan. 4, 1972     K. NORCROSS     3,632,727
POLYURETHANE SUEDE EMBOSSING
Filed July 3, 1969     4 Sheets-Sheet 1

United States Patent Office 3,632,727
Patented Jan. 4, 1972

3,632,727
POLYURETHANE SUEDE EMBOSSING
Kenneth Norcross, Heysham, England, assignor to Nairn-Williamson Limited, Lune Mills, Lancaster, England
Continuation-in-part of application Ser. No. 631,680, Apr. 18, 1967. This application July 3, 1969, Ser. No. 838,801
Claims priority, application Great Britain, Apr. 20, 1966, 17,296/66
Int. Cl. B29c 1/02
U.S. Cl. 264—232
9 Claims

ABSTRACT OF THE DISCLOSURE

A process for producing a suede pattern in relief on the surface of a polyurethane sheet material which comprises contacting a silicone elastomer mold surface bearing a negative suede pattern and a sheet material presenting a thermoplastic polyurethane surface to the mold, heating the mold and sheet material to a temperature at which the polyurethane surface is flowable and subjecting the assembly to a pressure within the range 40–400 p.s.i.g. for 120–6 seconds at this temperature, cooling the mold and sheet material and maintaining them in contact until the polyurethane ceases to be flowable under the prevailing temperature and pressure, and stripping the polyurethane sheet material from the mold.

FIELD OF THE INVENTION

The present invention relates to an embossing process for producing artificial polyurethane suede-like material.

DESCRIPTION OF THE PRIOR ART

Embossing techniques are widely used for the manufacture of bold patterns in relief on plastics sheet material, and imitation fabrics with a coarse weave can be produced in this way. The sheet material to be embossed may be heated until it is effectively molten and passed between two rolls of a calender, one roll being an embossing roll and bearing a negative of the pattern to be impressed, and the other roll a backing roll either bearing a positive of the pattern or being formed from an elastic resilient composition. One disadvantage of this technique is that it is difficult and expensive to engrave fine deep detail on the embossing roll, and thus the technique is really only applicable to somewhat crude patterns. Specifically it is impossible by conventional embossing to obtain the fibrous surface necessary for a realistic simulation of suede. Furthermore, the embossing roll is normally cooled internally with water, and thus the plastic material being embossed is chilled before it can penetrate into and take up any fine deeply engraved detail on the roll. If the embossing roll is allowed to run hot to avoid this drawback, then the plastic will still be molten when it has passed through the calender, and the detail it has taken up will tend to flow and thus be lost. Very high pressures are necessary to ensure that any fine detail is transferred to the sheet of the plastic, especially as the dwell time in normal embossing is very short, the plastic is generally highly viscous, and there is only line contact between the embossing roll and the backing roll.

CROSS-REFERENCES TO RELATED APPLICATIONS

This application is a continuation-in-part of application Ser. No. 631,680 filed Apr. 18, 1967, now abandoned. Application Ser. No. 838,800 filed simultaneously herewith is directed to products which may be made by the present invention.

SUMMARY OF THE INVENTION

An object of this invention is to produce artificial suede more closely resembling natural suede than has hitherto been possible.

Broadly this object is achieved by a seris of steps, namely (a) Bringing into face-to-face contact a mold of a silicone elastomer bearing a negative of the suede pattern and a sheet material presenting a thermoplastic polyurethane surface to the mold;

(b) Heating the assembly of mold and sheet material to a temperature at which the polyurethane surface is flowable and subjecting the assembly to a pressure of from 40 to 400 p.s.i. for a duration of 120 to 6 seconds while at this temperature, said pressure and duration being correlated to enable the polyurethane to acquire the pattern of the mold;

(c) Cooling said mold and sheet material in contact with one another and maintaining the contact between them until said polyurethane has creased to be flowable under the prevailing conditions of pressure and temperature; and (d) Stripping said sheet material from said mold.

DETAILED DESCRIPTION OF THE PREFERRED EMBODIMENTS

The sheet materials made by the process of the invention are particularly useful for making up as articles of clothing or as shoe uppers. While they may consist solely of polyurethane, this is expensive, and for the purposes in question the sheet materials are preferably laminated, the polyurethane simply constituting a thin surface layer. The materials may in fact be of the kind known as leathercloth, the polyurethane being carried by a fabric backing with or without an intermediate layer. It is advantageous to provide an intermediate layer of a cheaper plastic such as a polyvinyl chloride, a polyurethane forming the surface only.

Figure 1:
FIGS. 1, 2 and 3 are views at various magnifications of polyurethane suede products produced in accordance with the process of the present invention.
Figure 2:
Figure 3:
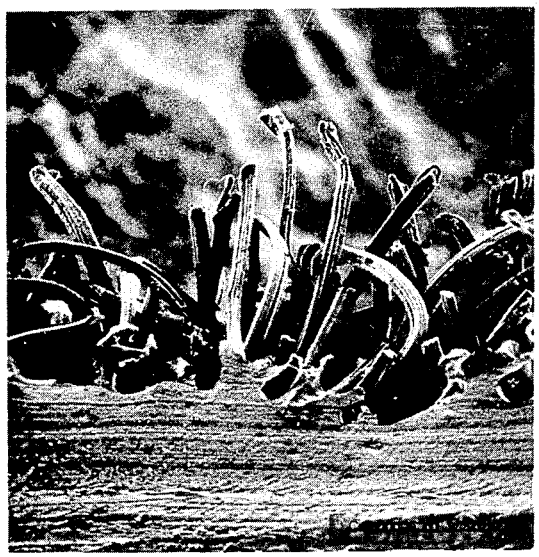

A typical product is shown in FIGS. 1 to 3, in which FIG. 1 is a photomicrograph taken at 65 magnifications of a section of the product; FIG. 2 is a photomicrograph taken at 250 magnifications of a section of part of this product; and FIG. 3 is a photomicrograph taken at 145 magnifications of the surface of the product.

The product illustrated by FIGS. 1 and 3 is a leathercloth with a surface of polyurethane fibres projecting from and integral with underlying polyurethane.

The fibres shown are from about 10 to about 50 microns in diameter, though to give the best resemblance to natural suede they are preferably no more than about 30 microns in diameter. They are about 100 to about 300 microns long, and there are about 100,000 to about 600,000 fibres per square inch. Fibres of these dimensions give the appearance and feel of natural suede. Essentially FIGS. 1 and 2 show only the polyurethane, but FIG. 3 shows the fibres 1 projecting from a thin body layer 2 of polyurethane which is keyed to a polyvinyl chloride layer 3 by a thin key layer 4. The polyvinyl chloride layer 3 has penetrated into and has become firmly united to a woven cotton fabric backing 5.

The production of the suede-like pattern is normally the last step in the manufacture of the sheet materials of the invention, a leathercloth or similar product with a plain polyurethane surface first being made. In this initial material the polyurethane layer may typically be from 0.003 to 0.008 inch thick, and a polyvinyl chloride layer beneath it may be thicker, for example about 0.025 inch thick. The backing may be a cotton or other fabric.

In the course of the manufacture of the initial leathercloth it may be necessary or desirable to pre-coat the fabric backing with a conventional key compound to improve the adhesion of the next layer. Similarly it may be desirable to use a key compound to improve the interadhesion of the intermediate and surface layers. Polyurethane will not normally require a key compound to adhere it to a nylon backing but it is desirable to have a key compound between polyvinyl chloride and polyurethane.

For materials to be used as articles of clothing or as shoe uppers desirable properties are good flexibility, good flexing life and good resistance to rubbing. It is found that these properties are best obtained when the polyurethane contains ester groups, though polyurethanes containing ether groups may also be used. Suitable polyurethane are composed of the reaction products of a mixture of components including a polyisocyanate together with a po lyol or a polyamine or both. The polyisocyanate may be a di- or tri-isocyanate or an isocyanate adduct bearing, for example, both isocyanate and urethane groups, or a pre-polymer having two or more active isocyanate groups per molecule. Suitable pre-polymers contain urethane and ester groups, or urethane and ether groups. The polyisocyanate component contain at least two isocyanate groups per molecule and the polyol or polyamine components at least two hydroxy or amine groups per molecule. The polyol may be a simple diol or triol or a pre-polymer containing urethane groups and ester or ether groups in addition to the active hydroxy groups.

The preferred polyurethanes employed in the invention contain ester groups, are flowable in the temperature range of about 170 to about 175° C., and have a number average molecular weight of from 30,000 to 40,000.

Such a product as that illustrated by FIGS. 1 to 3 is made according to the invention by pressing together the plain leathercloth and a mold formed by a sheet of a silicone elastomer bearing a negative of the suede-like pattern while heating this assembly to a temperature at which the polyurethane is rendered flowable, though it is extremely viscous, and maintaining the pressure for a predetermined period of time which depends upon the pressure itself. Thereafter, the assembly is cooled to a temperature at which the polyurethane ceases to be flowable. It is found that the product and the mold sheet can easily be stripped from one another and that the product possesses the extremely fine pattern of the mold sheet. In this process mere passage of the two sheets between a pair of nip rolls fails to produce the desired product. Adequate duration of the application of pressure is essential. Broadly, with polyurethanes suitable for use in this invention satisfactory results are obtained by applying a pressure of from about 40 to about 400 pounds per square inch for from about 120 to about 6 seconds. The pressure and period of time are correlated to enable the polyurethane to acquire the pattern of the mold. If in an initial experiment it is found that the pattern has not been fully acquired, either the pressure or the period of time or both must be increased. Of course the polyurethane must be in the appropriate temperature range while it is being forced to flow into the very narrow fibre-forming cavities in the mold, and the speed with which it reaches the desired temperature depends in part on the type of machine in which the manufacture is carried out. The temperature range is advantageously from 160 to 190° C.

The polyurethane may be at room temperature when it makes contact with the mold, but it is better to soften it by preheating so that it will more readily flow quickly into the fibre-forming cavities. Preheating also allows the process to be speeded up somewhat. The preheating may be such as to bring the polyurethane temperature up to about 160° C., though preheating to any temperature below this presents some utility.

Cooling while the mold and polyurethane are in contact with one another is important. If the polyurethane is still flowable when it is separated from the mold, the fibres are deformed and tend to fuse together. It is best to cool nearly to room temperature, say to 25° C. or 30° C., before stripping the polyurethane from the mold.

The fibres in the stripped product retain their orientation and discrete structure shape in the absence of immediate surface pressure, but it is found that they are still susceptible to deformation by only slight pressure for a period of at least 24 hours after their formation, a period in which some aging effect seems to occur, and the aged fibres are essentially resistant to deformation. In particular, if the sheet material is immediately formed into a roll the pattern of a fabric backing tends to be taken up by the fibrous surface. Cut lengths can, however, be stacked face to face provided there are no more than six sheets in a stack, equivalent to a maximum pressure of about ⅛ ounce per square inch, and in general no more than this pressure should be exerted on the fibrous surface until 24 hours or more have elapsed.

Lengths of the sheet material are therefore preferably immediately transferred to shelves. A shelf period of 48 hours is convenient since it allows every shelf to be cleared after two days without risk of permanent deformation of the fibers when the sheets are stacked for transport.

It is most surprising that a silicone elastomer mold can be used at all in this process, because it would be assumed that the pattern on it would be crushed and deformed so as to be useless by the pressure necessary to press the polyurethane into the pattern. The advantage of an embossing process can thus be combined with the extra fine and accurate detail which can be reproduced from a negative of a fine pattern formed in silicon elastomer.

The molds used to produce the suede-like finish may be endless belts made as described in my Pat. No. 3,190,947 issued June 22, 1965, or sheets of any desired length made in the same way, the production of the mold including the step of coating an original pattern with a cold-curing liquid silicone resin. This original pattern may be an artificial suede produced by an electrostatic flocking process in which a fabric base coated with an adhesive passes over a metal table and beneath a metal sieve to which a very high electric potential is applied. Fibres from a cloud of flock formed above the sieve pass through the sieve, becoming electrostatically charged on the way, and move at high speeds towards the metal table but are of course intercepted by the adhesive-coated fabric. A peculiarity of the fibres in an original pattern so produced is that they extend essentially at right angles to the base and parallel to one another, so that the mold made from the original pattern contains numerous small parallel fibre-forming cavities. One of the surprising features of the present invention is that in the suede-like products made with the use of such a mold the fibres are randomly oriented, as shown in FIGS. 1 to 3. The random orientation obtained gives the product a much more realistic suede-like surface than the original pattern made by the electrostatic flocking.

While what may be regarded as the starting material, that is to say a plain leathercloth, may be made in any desired manner, an example of its production is as follows:

Example 1

A woven cotton fabric was coated with a thin layer of ungelled polyvinyl chloride, and the layer then gelled. A solution was then formed by 30 parts of a partially hydrolyzed copolymer of vinyl chloride and vinyl acetate sold under the trademark Vinylite V.A.G.H., 55 parts of methyl ethyl ketone, 18 parts of a 40% solution in methyl ethyl ketone of a soluble urethane rubber sold under the trademark Daltoflex 2S and 4.2 parts of a 75% solution in ethyl acetate of a polyisocyanate sold under the trademark Suprasec B, and this solution was spread on the polyvinyl chloride layer to give 0.3 ounce per square yard of solids and dried at 120° C. to form a key coat.

16 parts by weight of a linear ester-type thermoplastic polyurethane sold under the trademark Estane 5701, 0.4 part of stearic acid and 1.3 parts of carbon black pigment sold under the trademark Philblack G were mixed on a hot two-roll mill, and then melt-coated at 6 ounces per square yard onto the key-coated fabric using a Zimmer melt-coating machine as described in British Pat. No. 892,799. This resulted in a smooth polyurethane layer about 0.006 inch thick.

Figure 4:
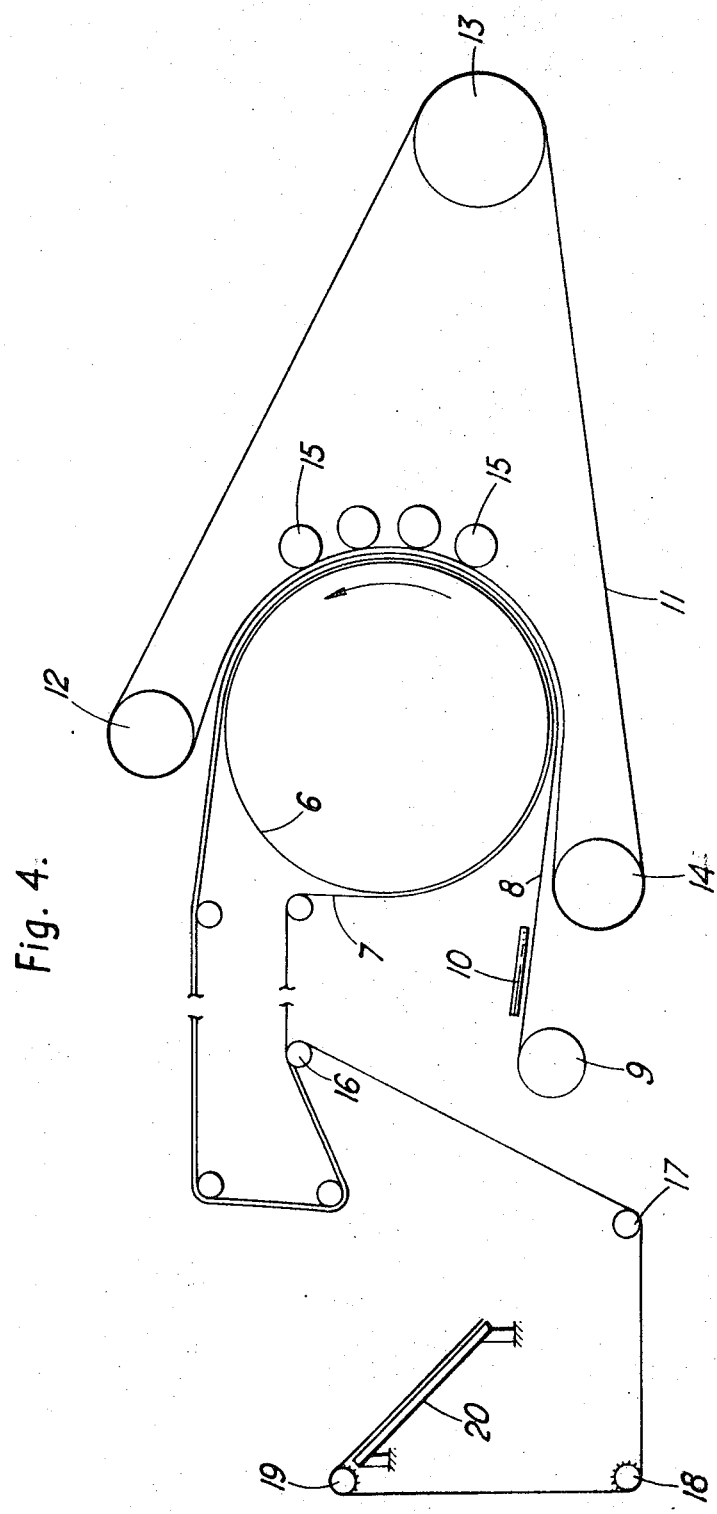
FIGS. 4 and 5 represent schematic illustrations of apparatus utilized in the process of the present invention.

FIG. 4 diagrammatically shows one plant in which a leathercloth such as that described in this example may be treated to produce the suede-like finish illustrated by FIGS. 1 to 3. This plant is based on a machine of the kind sold under the name "Rotocure," which includes a steam-heated drum 6 of large diameter around which the mold in the form of an endless belt 7, made as described above with its negative impression of a suede-like pattern, is passed. As the drum rotates, carrying the belt with it, the belt is heated and its outer patterned surface acquires a temperature of about 180° C.

The leathercloth of Example 1 with its plain polyurethane surface to be formed into the suede-like pattern is indicated at 8 and is fed from a roll 9 beneath a radiant heater 10 into contact with the belt 7. The assembly of belt and leathercloth is pressed against the drum by an endless belt 11 which passes round three rollers 12, 13 and 14. The pressure exerted by this belt 11 is low, being of the order of 10 to 20 p.s.i. The pressure required to force the polyurethane into the mold cavities is essentially exerted by four pressure rollers 15. The drum and the roller 12 are positively driven in synchronism, and the speed of the drum may, for example, be such that the belt and leathercloth are subjected to the relatively low pressure produced between the belt 11 and the drum 8 for 2 minutes, and for shorter periods during this time, about 6 seconds in all, are subjected to pressure of about 400 p.s.i. by the pressure rollers 15.

The leathercloth and belt travel together over a substantial distance as shown, so that on reaching a roll 16 their temperature has fallen to about 25° C. The leathercloth and belt are separated at this roll 16, the belt returning to the drum.

To avoid pressure being exerted on the newly formed fibres, the leathercloth passes onwards round another roll 17 and two rolls 18 and 19 which are covered by wire carding, the fabric backing making contact with all these rolls. The wire carding on the rolls 18 and 19, both of which are positively driven, grips the backing. From the roll 19 the leathercloth passes onto an inclined table 20, being driven down this by the rolls 18 and 19, assisted by gravity. An operative is stationed at the table 20 and cuts the leathercloth into desired lengths. The cut lengths are stored flat on shelves for 48 hours before being packed for delivery to the customer. After this period the fibres resist deformation.

In a plant of the kind diagrammatically shown in FIG. 4, in which the drum was about 4 feet in diameter, satisfactory products (including those from which the photomicrographs of FIGS. 1 to 3 were taken) have been produced when the linear speed of the belt and leathercloth assembly was 18 inches per minute and the time spent in cooling before the stripping of the product from the belt was about 12 minutes.

Figure 5:
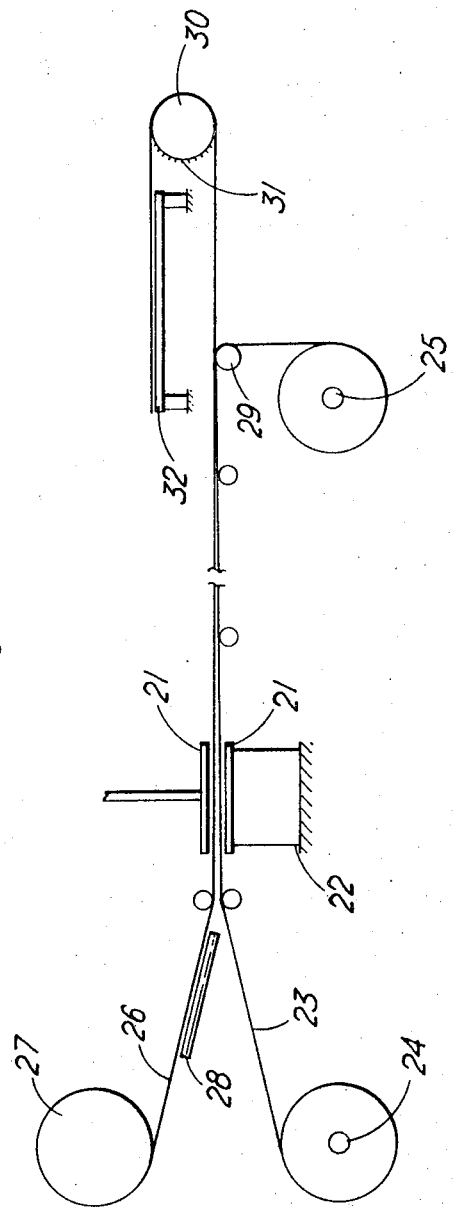

FIG. 5 shows a second form of plant that may be used. Here the assembly of mold and leathercloth is pressed between heated platens 21 of a press 22. The operation is stepwise, and the platens are of the surface area required in the product sheets. The mold is formed by a patterned sheet of silicone elastomer 23, which is wound off a drum 24 onto a drum 25, passing between the platens 21 in its travel. Leathercloth 26 is unwound from a roll 27, passes over a radiant pre-heater 28 by which the polyurethane surface is heated, and meets the mold 23 before passing between the platens 21. When each successive length of the assembly is halted between the platens, these are brought together to subject the assembly to pressure for a predetermined period. The assembly is then moved through a distance equal to the length of the platens and the operation is repeated on the next length of the assembly, and so on. The mold and leathercloth are separated at a roll 29, the mold passing from this to the roll 25. The leathercloth travels onwards round a roll 30 with wire carding 31 onto a table 32, where an operative cuts it into the desired lengths, which are thereafter stored for 48 hours. Pre-heating, though desirable in the plant shown in FIG. 5, is not so important as in the plant shown in FIG. 4.

EXAMPLE 2

A coated fabric is processed in the plant shown diagrammatically in FIG. 5. This coated fabric is made by coating a woven cotton fabric with 15½ ounces per square yard of a conventionally formulated plasticized polyvinyl chloride, and heating it to gel the polyvinyl chloride. A solution consisting of 8½ parts of a soluble polyurethane sold under the trademark Estane 5702F, 8½ parts of a polyvinyl chloride sold under the trademark Norvinyl S3/55, 66½ parts of methyl ethyl ketone and 16½ parts of tetrahydrofuran is spread on the gelled polyvinyl chloride layer, to give 0.1 ounce per square yard of solids, and dried at 100° C. to form a key-coat. 35 parts of a linear ester-type thermoplastic polyurethane sold under the trademark Estane 5701, 3 parts of a carbon black pigment sold under the trademark Philblack G and 1½ parts of stearic acid are mixed in a Banbury mixer and then melt-coated at 5 ounces per square yard on to the key-coated material using a Zimmer melt-coated machine as described in British patent specification No. 892,799.

The coated fabric is then fed into the plant shown in FIG. 5, the preheater not being used. The platens 21 are maintained at 175° C., and they subject the coated fabric to a pressure of 80 p.s.i. for a period of 2 minutes. The thus-patterned material is cooled to about room temperature before it reaches the table 32.

I claim:
1. A process for producing a suede pattern in relief on the surface of a sheet material which comprises the steps of:
  (a) bringing into face-to-face contact a mold of a silicone elastomer bearing a negative of the suede pattern and a sheet material presenting a thermoplastic polyurethane surface to the mold;
  (b) heating the assembly of mold and sheet material to a temperature at which the polyurethane surface is flowable and subjecting the assembly to a pressure of from 40 to 400 p.s.i. for a duration of 120 to 6 seconds while at this temperature, said pressure and duration being correlated to enable the polyurethane to acquire the pattern of the mould;
  (c) cooling said mold and sheet material in contact with one another and maintaining the contact between them until said polyurethane has ceased to be flowable under the prevailing conditions of pressure and temperature;
  (d) stripping said sheet material from said mold; and thereafter
  (e) aging the stripped sheet material free from surface pressure which is greater than about ⅛ ounce per square inch for a period of time sufficient for the suede pattern to become resistant to permanent deformation in response to surface pressure.

2. A process according to claim 1 in which the polyurethane contains ester groups and the temperature to which the assembly is heated is from about 160 to about 190° C.

3. A process according to claim 1 including the step of pre-heating the polyurethane surface before bringing it into contact with the mold.

4. A process according to claim 1 in which the polyurethane contains ester groups and has a number average molecular weight of from 30,000 to 40,000.

5. A process according to claim 1 in which the sheet material is a laminate in which the polyurethane forms a surface layer.

6. A process according to claim 1 in which the mold has from about 100,000 to about 600,000 fibre-forming cavities per square inch, said cavities being less than 50 microns in diameter and from about 100 to about 300 microns in depth.

7. A process according to claim 1 wherein said cooling is to about room temperature.

8. A process according to claim 3 wherein said preheating is to a temperature up to about 160° C.

9. A process for producing a suede pattern in relief on the surface of a sheet material which comprises the steps of:
(a) bringing into face-to-face contact a mold of a silicone elastomer bearing a negative of the suede pattern and a sheet material presenting a thermoplastic polyurethane surface to the mold;
(b) heating the assembly of mold and sheet material to a temperature at which the polyurethane surface is flowable and subjecting the assembly to a pressure of from 40 to 400 p.s.i. for a duration of 120 to 6 seconds while at this temperature, said pressure and duration being correlated to enable the polyurethane to acquire the pattern of the mould;
(c) cooling said mold and sheet material in contact with one another and maintaining the contact between them until said polyurethane has ceased to be flowable under the prevailing conditions of pressure and temperature;
(d) stripping said sheet material from said mold; and thereafter
(e) aging the stripped sheet material free from substantial surface pressure for a period of time sufficient for the suede pattern to become resistant to permanent deformation in response to surface pressure, said aging effected in the absence of surface pressure greater than ⅛ ounce per square inch for more than 24 hours.

References Cited

UNITED STATES PATENTS

| | | | |
|---|---|---|---|
| 2,749,266 | 6/1956 | Eldred | 264—136 X |
| 3,061,873 | 11/1962 | Supitilov | 264—313 X |
| 3,098,262 | 7/1963 | Wisotzky | 18—26 |
| 3,190,947 | 6/1965 | Norcross | 264—216 |

FOREIGN PATENTS

| | | | |
|---|---|---|---|
| 3,341,646 | 9/1967 | Great Britain | 264—213 |
| 1,353,677 | 1964 | France | 264—293 |
| 1,071,824 | 1967 | Great Britain | 264—321 |

ROBERT F. WHITE, Primary Examiner

R. R. KUCIA, Assistant Examiner

U.S. Cl. X.R.

264—293, 316